United States Patent
Ming et al.

(10) Patent No.: US 10,460,758 B2
(45) Date of Patent: Oct. 29, 2019

(54) DISK CLAMPING MECHANISM INCLUDING ANNULAR RING MEMBER

(71) Applicant: Seagate Technology LLC, Cupertino, CA (US)

(72) Inventors: Yap Pow Ming, Singapore (SG); Su Ying, Singapore (SG); Cho Kok Liang, Melaka (MY); Lee Chee Xian, Singapore (SG); Lim Jun Long, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/916,451

(22) Filed: Mar. 9, 2018

(65) Prior Publication Data

US 2019/0279677 A1 Sep. 12, 2019

(51) Int. Cl.
*G11B 17/038* (2006.01)
*G11B 17/028* (2006.01)
*G11B 17/022* (2006.01)
*G11B 17/02* (2006.01)
*G11B 19/20* (2006.01)

(52) U.S. Cl.
CPC .......... *G11B 17/0287* (2013.01); *G11B 17/02* (2013.01); *G11B 17/022* (2013.01); *G11B 17/028* (2013.01); *G11B 17/0284* (2013.01); *G11B 17/038* (2013.01); *G11B 19/2009* (2013.01)

(58) Field of Classification Search
CPC . G11B 17/0287; G11B 17/028; G11B 17/022; G11B 17/038; G11B 17/02
See application file for complete search history.

(56) References Cited

U.S. PATENT DOCUMENTS

| 4,918,545 | A | * | 4/1990 | Scheffel | ................ | G11B 17/02 |
| | | | | | | 360/98.08 |
| 5,452,157 | A | * | 9/1995 | Chow | ................ | G11B 25/043 |
| | | | | | | 360/98.08 |
| 5,459,627 | A | | 10/1995 | Peter | | |

(Continued)

FOREIGN PATENT DOCUMENTS

| JP | 2006065959 A | * | 3/2006 | ......... G11B 17/0287 |
| JP | 2006139859 A | * | 6/2006 | |

OTHER PUBLICATIONS

"Method for Disk File Disk Clamping," Nov. 1981, IBM Technical Disclosure Bulletin, vol. No. 24, iss. No. 6, pp. 2765-2766. (Year: 1981).*

(Continued)

*Primary Examiner* — William J Klimowicz
(74) *Attorney, Agent, or Firm* — Kagan Binder, PLLC

(57) ABSTRACT

A disk drive assembly including a spindle motor including a hub and a central axis, at least one disk disk having a central opening positioned on the hub and concentric about the central axis, an annular ring member concentric about the central axis, wherein a first portion of the annular ring member is in contact with an outer surface of a top disk of the disk stack, and a disk clamp ring screw adjacent to and in contact with a second portion of the annular ring member, wherein the disk clamp ring screw provides a clamping force to at least partially compress the annular ring member toward the top disk of the disk stack.

9 Claims, 3 Drawing Sheets

(56) References Cited

U.S. PATENT DOCUMENTS

| | | | |
|---|---|---|---|
| 5,517,376 A * | 5/1996 | Green | G11B 17/02 |
| | | | 360/98.08 |
| 5,548,457 A | 8/1996 | Brooks et al. | |
| 5,731,928 A * | 3/1998 | Jabbari | G11B 17/038 |
| | | | 360/98.08 |
| 6,366,427 B1 | 4/2002 | West | |
| 6,567,238 B1 | 5/2003 | Renken et al. | |
| 6,807,721 B2 | 10/2004 | Choo et al. | |
| 8,908,325 B1 | 12/2014 | Heo et al. | |
| 9,064,529 B2 | 6/2015 | Takahashi et al. | |
| 9,343,101 B2 | 5/2016 | Suzuki et al. | |
| 2006/0103975 A1 * | 5/2006 | Tokumiya | G11B 17/02 |
| | | | 360/99.12 |
| 2014/0293483 A1 | 10/2014 | Le et al. | |
| 2015/0371675 A1 * | 12/2015 | Suzuki | G11B 17/0287 |
| | | | 360/99.12 |

OTHER PUBLICATIONS

"HDD Disk Clamp with High Compliance and Low Radial Load," Feb. 1, 1994, IBM Technical Disclosure Bulletin, vol. No. 37, iss. No. 2B, pp. 379-380. (Year: 1994).*

* cited by examiner

DISK CLAMPING MECHANISM INCLUDING ANNULAR RING MEMBER

BACKGROUND

Large amounts of digital data can be stored in magnetic form on storage medium such as disks that rotate about a central hub in a disk drive. Hard disk drives (HDDs) generally include at least one rigid disk that is coated with magnetic material and that is spun around the hub at high speed. Information that is stored on the disks is provided in an organized manner that is accessible by a read/write head for reading information from disk tracks and writing information to disk tracks. Over the years, HDDs have become smaller and slimmer as consumer demand increases for more portable and lighter digital products. This has resulted in the design of the HDD changing to include top cover attached motors among the smaller form factor HDDs.

Disk drives generally include a disk clamping element that provides a disk clamping force for holding one or more disks to the hub. Reliable disk clamping is important both under normal operating conditions for HDDs and under extreme conditions such as operational shock and non-operational shock. Keeping the disks in position relative to each other and the hub, even during shock events, is important in maintaining accurate reading and writing of data. In addition, the use of reliable clamping configurations can help to minimize or prevent disks from moving into contact with other components in the disk drive, such as other disks, the cover, the suspension, and the like.

One challenge of using a top cover attached motor in a HDD is keeping the disks held securely in their desired configuration. In more traditional or larger HDDs, the media can be held by a center screw disc clamp. However, this design is not typically used for a top cover attached motor design. Current popular media clamping methods for top cover attached motors involve utilization of a disc clamp ring screw or a three screw disc clamp, both of which may be prone to disk contamination and/or uneven clamping in the axial direction of the disk. In fact, certain designs for clamping covers can generate particles as the external threads of the disc clamp ring screw move through the internal threads of the screw hole during the installation process. The particles can then settle on the media below. In certain cases, the screw may even rub against the media and cause further contamination and/or damage to the media itself.

There is therefore a need to provide reliable disk drive clamping designs that minimize or eliminate drawbacks related to clamping of disks in HDDs, such as those with top cover attached motors.

SUMMARY

Aspects of the invention described herein are directed to a disk drive assembly that includes a spindle motor having a hub and a central axis, a disk stack comprising at least one disk, each disk comprising a central opening positioned on the hub and concentric about the central axis, an annular ring member concentric about the central axis, wherein a first portion of the ring member is in contact with an outer surface of a top disk of the disk stack, and a disk clamp ring screw adjacent to and in contact with a second portion of the ring member, wherein the disk clamp ring screw provides a clamping force that at least partially deforms or compresses the ring member toward the top disk of the disk stack.

The annular ring member of disk drive assemblies provided herein can have a V-shaped profile, wherein the first and second portions of the ring member extend from an apex at their respective proximal ends. The first portion of the ring member may include a distal end that is moveable toward and away from a distal end of the second portion of the ring member. The apex of the ring member can be closer to the central axis than the distal ends of the first and second portions of the ring member.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
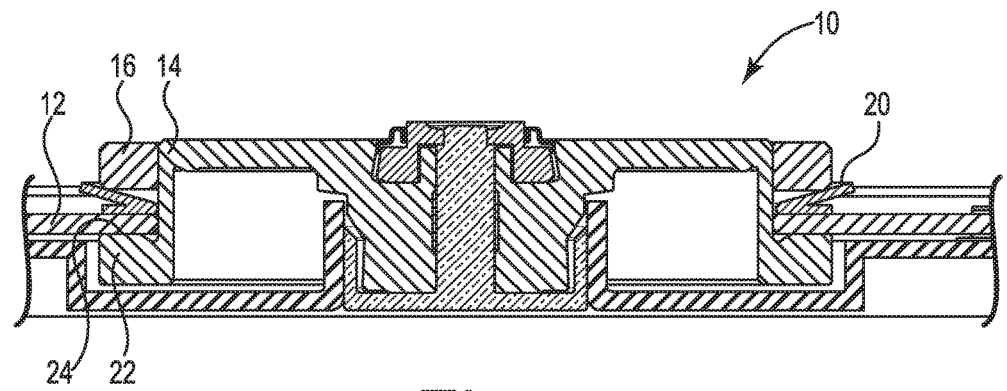
FIG. 1 is a cross-sectional side view of a central portion of a disk drive including a disk clamp ring screw and an annular ring member in its compressed configuration between a top disk surface and the disk clamp ring screw.

In accordance with embodiments of the invention discussed herein, an annular or auxiliary ring is provided for hard disk drives that have a top cover attached motor and that utilize a disk clamp ring screw to secure disks within the drive, for example. One disk drive configuration in which this annular ring can be used includes a hub, at least one disk in contact with and supported by at least one mounting surface of the hub, and a read/write head assembly for reading from and writing to the disks. The hub may include a cylindrical portion, a longitudinal axis, and a mounting surface normal to the longitudinal axis and extending radially outward from the longitudinal axis.

As described herein, embodiments of disk drives generally include a magnetic disk drive, but may include other drives, such as optical and magneto-optical disk drives, for example. The disks themselves may comprise any of a variety of magnetic or optical disk media concentrically arranged about a longitudinal axis. In general, one or both surfaces of the disk include multiple generally concentric tracks on which data is stored. The hub may also be rotatably attached to a motor base of the disk drive, and may form one component of a motor (e.g., a spindle motor). The motor and the hub may be configured to rotate the disks about the longitudinal axis.

In order to secure the disk or disks within the drive, a disk clamp ring screw may be coupled to the hub to provide a downward clamping force to the disks. The disk clamp ring screw may be positioned above the one or more disks and attached at an upper surface of the hub. The disk clamp ring screw may include a threaded region that interacts with corresponding threads on the hub. The interaction of the disk clamp ring screw and the hub provide a downward clamping force. Embodiments of the disk drive described herein further include an annular ring member positioned between the disk and the disk clamp ring screw, which is described below in detail.

The disk drive may further include a cover, which may house the disks and the motor. The disk drive may also include a head stack assembly rotatably attached to the motor base. The head stack assembly may include an actuator including an actuator body and one or more actuator arms extending from the actuator body. The actuator body may further be configured to rotate about an actuator pivot axis.

One or two head gimbal assemblies may be attached to a distal end of each actuator arm. Each head gimbal assembly includes a head operable to write to and read from a corresponding disk. The head stack assembly may further include a coil through which a changing electrical current is passed during operation. The coil interacts with one or more magnets that are attached to the motor base to form a voice coil motor for controllably rotating the head stack assembly. The head or heads are generally used for writing to and reading from a disk. In magnetic recording applications, the head may include an air bearing slider and a magnetic transducer that includes a writer and a read element.

Figure 2:
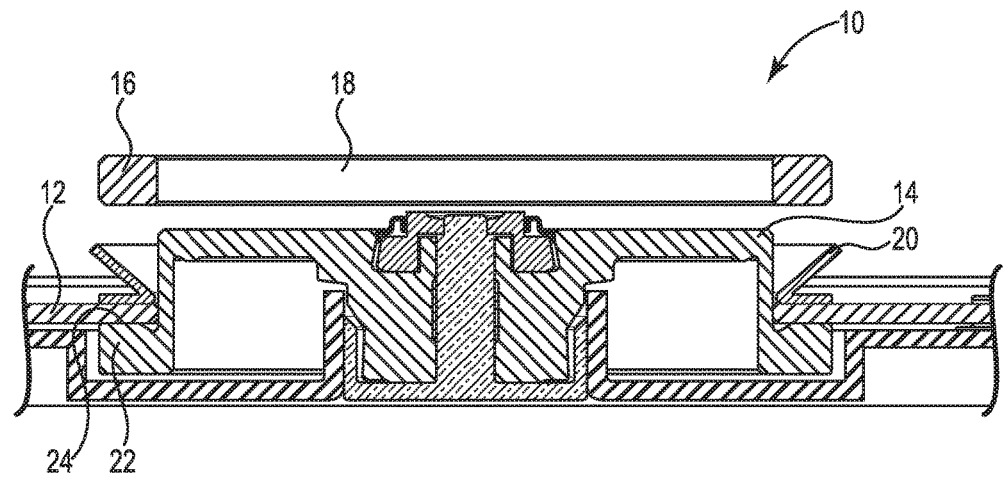
FIG. 2 is a cross-sectional side view of a central portion of the disk drive of FIG. 1 prior to engagement of the disk clamp ring screw with a hub member, which is also prior to compression of the annular ring member.
Figure 3:
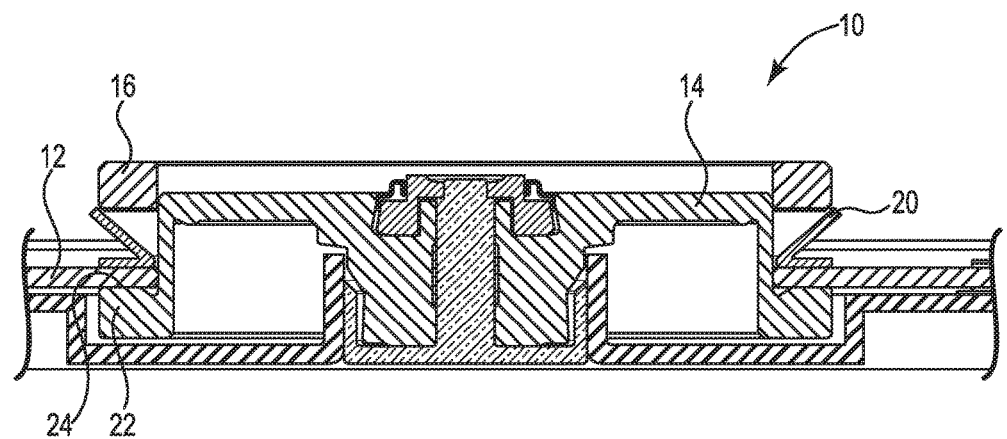
FIG. 3 is a cross-sectional side view of a central portion of the disk drive of FIG. 1 with the disk clamp ring screw partially engaged with the hub member but prior to compression of the annular ring member.

Referring additionally to the Figures, wherein the components are labeled with like numerals throughout the several Figures, and initially to FIGS. 1-3, cross-sectional side views of an embodiment of a central portion of a disk drive 10 is illustrated, which includes a disk 12 clamped relative to a hub 14 using a disk clamp ring screw 16 having a central opening 18. In embodiments, the disk drive 10 can include a disk stack including multiple disks 12, wherein the embodiments of a disk described herein are considered to be referring to a top disk of a multiple disk stack. In cases where multiple disks 12 are provided, appropriate spacing mechanisms are provided to keep the disks from contacting each other. The disk drive 10 further includes an embodiment of an annular ring member 20, as described herein. FIG. 1 illustrates the disk drive 10 in an assembled configuration with the annular ring member 20 in its deformed or compressed condition, FIG. 2 illustrates the disk drive 10 with the annular ring member 20 positioned relative to the hub 14 in its uncompressed condition prior to attaching the disk clamp ring screw 16 to the assembly, and FIG. 3 illustrates the disk drive 10 with the disk clamp ring screw 16 partially engaged with the hub 14 but prior to compression of the annular ring member 20.

The disk 12 includes a central opening that is configured for positioning on an outer cylindrical surface of the hub 14. The hub 14 further includes a shoulder 22 that provides an upper surface 24 on which the surface of the disk 12 adjacent to its central opening can rest, and which provides a surface against which the clamping of the disk 12 can occur.

The cylindrical outer surface of the hub 14 is further configured for engagement with the central opening 18 of the disk clamp ring screw 16. In an embodiment, the outer surface of the hub 14 includes at least a portion that is threaded, while the inner surface of the central opening 18 of the disk clamp ring screw 16 includes a corresponding threaded surface that for engagement with the threaded portion of the outer surface of the hub 14. In an alternative embodiment, the disk clamp ring screw 16 is engaged with the outer surface of the hub 14 with a pressure-fit, frictional, or other type of secure engagement between the surfaces.

Figure 4:
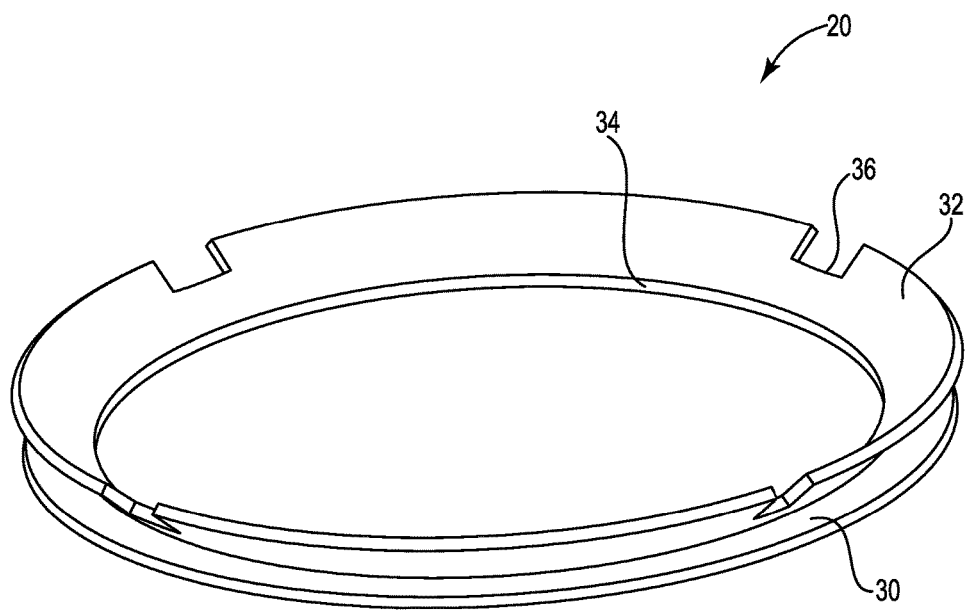
FIG. 4 is a perspective view of an annular ring member of the type illustrated for use in FIGS. 1-3.
Figure 5:
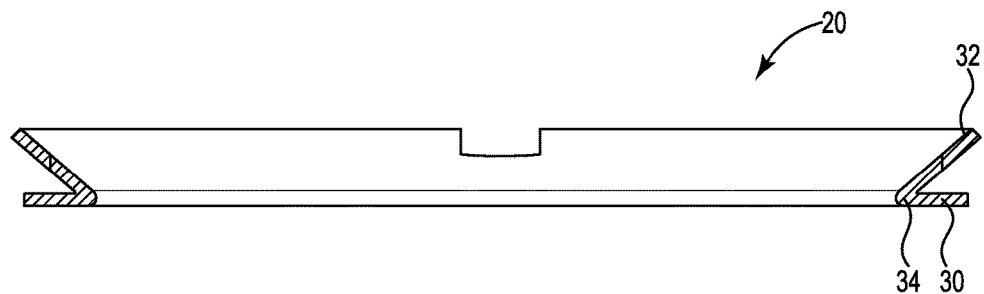
FIG. 5 is a side view of the annular ring member of FIG. 4.

Prior to engaging the disk clamp ring screw 16 to the outer surface of the hub 14, an inner opening of the annular ring member 20 is placed over the hub 14 on top of the disk 12 adjacent to the hub 14. Referring additionally to FIGS. 4 and 5, annular ring member 20 is shown in its uncompressed or resting state, which is prior to any type of compression, which is the condition in which it will be installed in the disk drive 10. Annular ring member 20 is a circular ring that includes a first portion 30 from which a second portion 32 extends outwardly at an angle from an apex or intersection area 34. In particular, the proximal ends of the first and second portions 30, 32 meet at the intersection area 34, while the distal ends of the first and second portions 30, 32 are spaced outwardly from the apex and are spaced from each other by a distance that corresponds with the angle between the first and second portions 30, 32. As shown and described, the intersection area 34 will be adjacent to the outer surface of the hub 14 when positioned in the disk drive 10, such that the first and second end portions 30, 32 extend radially outward from the intersection area 34.

In the illustrated embodiment, the first portion 30 is shorter than the second portion 32, although it is contemplated that the second portion 32 can be shorter than the first portion 30 or that the first and second portions 30, 32 can have the same or nearly the same length. As shown, the first portion 30 is generally planar such that its lower surface will contact a flat or planar portion of the upper surface of an adjacent disk 12. While the second portion 32 is also shown as being planar or linear, it is contemplated that the second portion includes one or more sections that are curvilinear or angled differently than the rest of the second portion 32.

The annular ring member 20 can be constructed as a single piece or unitary construction, such as by a stamping operation, or can be made of multiple pieces that are connected to each other, such as at the intersection area 34 or at any other area along one or both portions 30, 32. In either case, the annular ring member 20 can be made of one or more than one material, wherein the material(s) are selected to provide particular properties to the ring. For example, each material can be selected to provide a desired flexibility to the ring member 20 that allows second portion 32 to be pressed toward the first portion 30 without fracturing the ring member 20, yet is not excessively stiff such that it provides excessive resistance when moving the second portion 32 toward the first portion 30. The material(s) from which the annular ring member 20 is constructed can provide for a construction that is either elastic, such as can be achieved with a shape-memory material, or permanent, such that compression or deformation of the ring member 20 will not change if the disk clamp ring screw 16 is removed.

As discussed above, the distal ends of the first and second portions 30, 32 will be spaced from each other by a certain distance with the annular ring member 20 is in its resting state, such as is illustrated in FIGS. 4 and 5, for example. However, it is understood that the illustrated angle between the first and second portions 30, 32 only represents one of many possible angles between these portions in their resting state, and that larger or smaller angles are contemplated. In addition, the relative change in the angle between the first and second portions 30, 32.

The various features of the ring member 20 are selected to provide desired properties relative to its use within a disk drive 10. For example, the lengths of the first and second portions 30, 32 and the angle between them will provide for a certain area of engagement between the first portion 30 and the top surface of the disk 12 adjacent to its central opening (e.g., see FIGS. 1-3, which illustrate the first portion 30 in contact with the top surface of the disk 12). In addition, with regard to the selection of the length of the second portion 32 of the annular ring member 30, the length is preferably long enough that the distal end of the second portion 32 will be positioned radially outward from an outer edge of the disk clamp ring screw 16. In this way, possible debris in the area of the second portion 32 will be more inclined to fall onto the annular ring member 20 than onto the surface of the disk 12. As another example, the annular ring member 20 is made deflectable so that a desired clamp force may be accurately achieved by simply monitoring how much the disc clamp ring screw 16 moves downwards during the assembly process.

The annular ring member 20 can optionally include one or more grooves or notches 36 along a distal end of its second portion 32, wherein the four notches 36 illustrated in FIG. 4 are only intended to be an exemplary quantify of this feature. These notches 36 can be useful so that the annular ring member 20 can be held stationary while the disk clamp ring screw is being installed.

During the disc clamp ring screw installation process, the annular ring member 20 is held in place so that the disk 12 is not in contact with any moving components and therefore is less susceptible to damage. The annular ring member 20 may have a rougher surface than the media such that during vacuum suction, contamination can also be easily removed.

FIGS. 6A-6D illustrate sequential cross-sectional side views of a portion of an embodiment of a disk drive 110 including installation of an annular ring member 120 and a disk clamp ring screw 116. Disk drive 110 includes a portion of a disk 112 clamped relative to a hub 114 using disk clamp ring screw 116. In embodiments, the disk drive 110 can include a disk stack including multiple disks 112, wherein the embodiments of a disk described herein are considered to be referring to a top disk of a multiple disk stack. In cases where multiple disks 112 are provided, appropriate spacing mechanisms are provided to keep the disks from contacting each other.

Figure 6A:
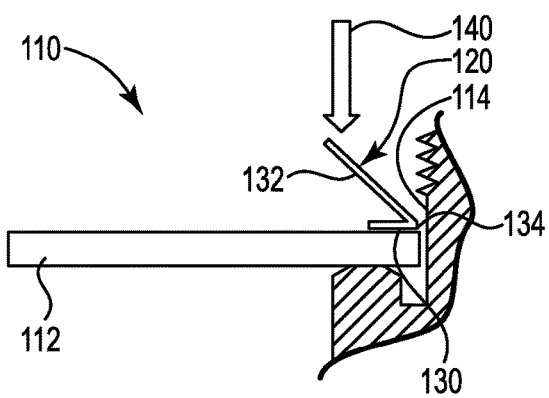
FIGS. 6A-6D are sequential cross-sectional side views of a portion of an embodiment of a disk drive including installation of an annular ring member and a disk clamp ring screw.
Figure 6B:
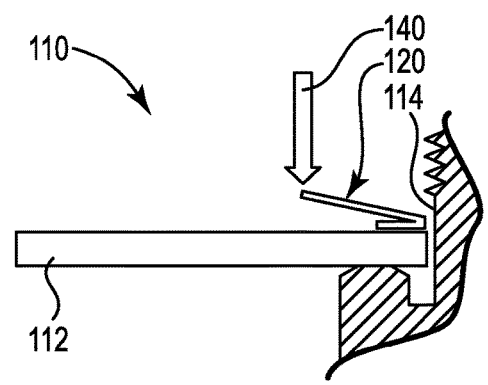
Figure 6C:
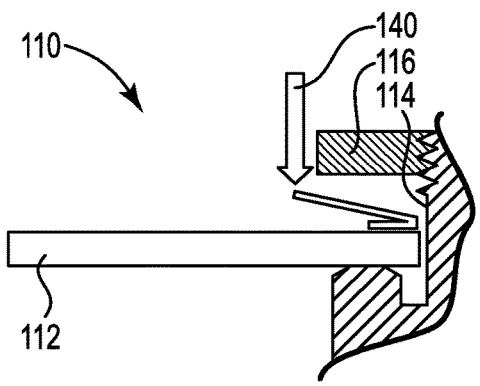
Figure 6D:
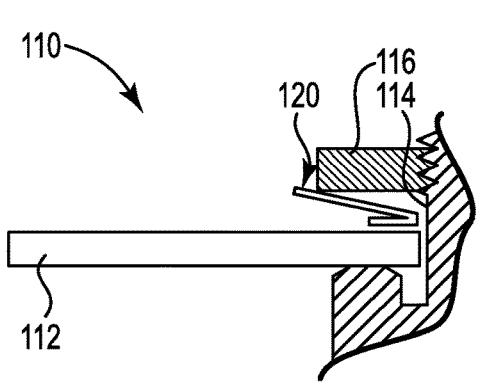

The disk drive 110 further includes an embodiment of an annular ring member 120, illustrated in FIGS. 6C and 6D. In this embodiment, the annular ring member 120 is a circular ring that includes a first portion 130 from which a second portion 132 extends outwardly at an angle from an apex or intersection area 134. In particular, the proximal ends of the first and second portions 130, 132 meet at the intersection area 134, while the distal ends of the first and second portions 130, 132 are spaced outwardly from the apex and are spaced from each other by a distance that corresponds with the angle between the first and second portions 130, 132. As shown and described, the intersection area 134 will be adjacent to the outer surface of the hub 114 when positioned in the disk drive 110, such that the first and second end portions 130, 132 extend radially outward from the intersection area 134.

In the illustrated embodiment, the first portion 130 is shorter than the second portion 132, although it is contemplated that the second portion 132 can be shorter than the first portion 130 or that the first and second portions 130, 132 can have the same or nearly the same length. In any case, with this embodiment, the outer diameter of the second portion 132 is larger than the outer diameter of the disk clamp ring screw 116. The distal end of second portion 132 will thereby extend beyond the outer surface of the disk clamp ring screw 116, which will provide further protection to the surface of the disk 112 from particles that may be generated during the process of installing the disk clamp ring screw 116

FIGS. 6A-6D illustrate an exemplary series of steps of assembling this portion of disk drive 110. FIG. 6A illustrates disk drive 110 with the annular ring member 120 positioned relative to the hub 114 in its uncompressed condition prior to attaching the disk clamp ring screw 116 to the assembly, with an arrow in direction 140 showing the direction of force to be directed to the second portion 132. FIG. 6B illustrates force being applied to the second portion 132 to move it toward the first portion 132 of annular ring member 120. The amount that the second portion 132 is moved toward the first portion 130 can be a predetermined distance that corresponds to a targeted clamp force.

Because outer diameter of the second portion 132 is greater than that of the disk clamp ring screw 116, the force in direction 140 can be maintained on the second portion 132 while the disk clamp ring 116 is being installed, as is shown in FIG. 6C, which shows the disk clamp ring screw 116 partially engaged with the hub 114. Once the disk clamp ring screw 116 is in its desired location, the force can be removed from the edge of the second portion 132 of annular ring member 120, as is illustrated in FIG. 6D.

In an alternative assembly method, the annular ring member 120 is initially pushed further beyond its desired final compression configuration and held in this position while the disk clamp ring 116 is engaged with hub 114 and moved to its final desired location. When the force exerted on the annular ring member is removed, second portion 132 of the annular ring member 120 can spring back up at least slightly to its targeted height so that a desired clamp force is achieved. With this assembly method, there is little to no contact between the disk clamp ring 116 and the annular ring member 120 until the disk clamp ring is installed in its desired position relative to the disk 112 and hub 114.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:
1. A disk drive assembly comprising:
a spindle motor comprising a hub and a central axis;
a disk stack comprising at least one disk, each disk comprising a central opening positioned on the hub and concentric about the central axis;
an annular ring member concentric about the central axis, the annular ring member comprising:
a first portion and a second portion extending from an apex at their respective proximal ends, the first portion and second portion each comprising a distal end spaced from its proximal end;
wherein the annular ring member is positioned so that the apex is closer than the distal ends of the first and second portions to an outer surface of the hub; and
wherein the first portion of the ring member is in contact with an outer surface of a top disk of the disk stack; and a disk clamp ring screw adjacent to and in contact with a second portion of the annular ring member, wherein the disk clamp ring screw provides a clamping force that at least partially compresses the second portion of the annular ring member toward the first portion of the annular ring member and toward the top disk of the disk stack.

2. The disk drive assembly of claim 1, wherein the annular ring member comprises a V-shaped profile.

3. The disk drive assembly of claim 1, wherein the distal end of the second portion of the annular ring member is moveable toward the distal end of the first portion of the annular ring member and toward the top disk of the disk stack.

4. The disk drive assembly of claim 1, wherein the second portion of the annular ring member comprises at least one notch along a distal edge.

5. The disk drive assembly of claim 1, wherein the first portion of the annular ring member has a length that is less than a length of the second portion of the annular ring member.

6. The disk drive assembly of claim 1, wherein the annular ring member comprises a unitary construction.

7. The disk drive assembly of claim 1, wherein the disk stack comprises a single disk.

8. The disk drive assembly of claim 1, wherein the annular ring member comprises a permanently deformable material.

9. A disk drive assembly comprising:
a spindle motor comprising a hub and a central axis;
a disk stack comprising at least one disk, each disk comprising a central opening positioned on the hub and concentric about the central axis;
an annular ring member concentric about the central axis, wherein a first portion of the ring member is in contact with an outer surface of a top disk of the disk stack; and
a disk clamp ring screw adjacent to and in contact with a second portion of the annular ring member, wherein the disk clamp ring screw provides a clamping force that at least partially compresses the second portion of the annular ring member toward the first portion of the annular ring member and toward the top disk of the disk stack;
wherein the second portion of the annular ring member has an outer diameter in its at least partially compressed configuration that is larger than an outer diameter of the annular ring member.

\* \* \* \* \*